(12) United States Patent
Chi et al.

(10) Patent No.: US 12,303,773 B2
(45) Date of Patent: May 20, 2025

(54) LIGHT SOURCE CALIBRATION FOR GAMING CONTROLLER IN DYNAMIC GAMING ENVIRONMENT

(71) Applicant: Dell Products L.P., Round Rock, TX (US)

(72) Inventors: Wei-Hsiang Chi, Taipei (TW); Jason Scott Morrison, Chadron, NE (US); YiMing Chou, Taipei (TW); Tyler Ryan Cox, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 190 days.

(21) Appl. No.: 18/353,073

(22) Filed: Jul. 15, 2023

(65) Prior Publication Data

US 2025/0018280 A1 Jan. 16, 2025

(51) Int. Cl.
 *A63F 13/22* (2014.01)
 *A63F 13/235* (2014.01)
 *H05B 47/165* (2020.01)

(52) U.S. Cl.
 CPC ............ *A63F 13/22* (2014.09); *A63F 13/235* (2014.09); *H05B 47/165* (2020.01)

(58) Field of Classification Search
 None
 See application file for complete search history.

(56) References Cited

U.S. PATENT DOCUMENTS

| | | | | |
|---|---|---|---|---|
| 10,342,092 B2 * | 7/2019 | Tada | ..................... | G09G 3/3413 |
| 11,716,798 B2 * | 8/2023 | Van De Sluis | ...... | H05B 47/125 |
| | | | | 315/152 |
| 12,219,680 B2 * | 2/2025 | Borra | ................... | H05B 47/115 |

\* cited by examiner

*Primary Examiner* — Kenneth B Wells

(74) *Attorney, Agent, or Firm* — Norton Rose Fulbright US LLP

(57) ABSTRACT

Systems and methods described herein may provide a system that enables adjusting the settings of light sources on peripheral devices, such as gaming controllers, to calibrate the light output of the light sources within a dynamic gaming environment. In some aspects, calibrating the light sources may provide for more consistent color or brightness between different light sources on the gaming controller. Methods for performing automated light source calibration based on lighting in a gaming environment are described.

20 Claims, 8 Drawing Sheets

LIGHT SOURCE CALIBRATION FOR GAMING CONTROLLER IN DYNAMIC GAMING ENVIRONMENT

FIELD OF THE DISCLOSURE

The instant disclosure relates to information handling systems. More specifically, portions of this disclosure relate to execution of applications in a multi-room user environment.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes, thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

SUMMARY

Information handling systems may be used to execute applications such as gaming applications. Users can interact with information handling systems with peripheral devices such as gaming controllers. Some peripheral devices include a plurality of light sources (e.g., LED lights). Aspects of embodiments of this disclosure address challenges in ensuring that the separate light sources on a peripheral device output light consistently with each other (e.g., at the same brightness, color, and/or timing). In some aspects, methods for adjusting and calibrating the light output of light sources on a peripheral device are described.

In some embodiments, the aspects described herein may be used to support the execution of gaming applications in different environments. Gaming sessions may execute on a service, either locally on a device, on another system on the network, or in the cloud. A device may access the gaming session by executing an application that communicates with the service to receive and transmit user input to the service and provide feedback to the user from the service. The device may include its own audio/visual (AV) output for displaying a graphical user interface and/or a rendered display from the gaming session. Different environments at a location may include different AV systems, and the device may be automatically paired with an AV system and may be reconfigured to support interaction with an application session using the paired AV system.

A user's home is one example location that may have multiple environments, such as a living room, a dining room, a study, and/or a bedroom, each with different screen configurations, speaker configurations, and/or network availability. Aspects of embodiments disclosed herein may provide a system that enables game play from a set of candidate game hosts and environments to consumption devices of a user's choice while the user moves about their home between the different environments. The system may employ methods to determine where a user is located within the home, availability and selection of candidate game hosting and target environments, homing and direction of related I/O, and/or AV for consumption. The system then migrates the user and their information to the determined environment by coordinating gameplay by the user. The solution accommodates multiple users simultaneously within the home, whether in single player, multiplayer using the same screen, or multiplayer using separate screen games. The solution may configure AV and input/output (I/O) such that multiple users can consume one or multiple games in the home simultaneously, whether in separate locations or when seated together in front of the same consumption device, e.g., a large television, where multiple games might be hosted simultaneously.

The mobility of a user between services and applications for executing an application session may be supported by an information handling system that uses available telemetry from multiple sources to build a confidence-based knowledge graph of the user's gaming environments and determine a position of the user within that graph. A system with knowledge of devices in a user's gaming environment may build a knowledge graph by aggregating and comparing telemetry. For example, network telemetry may reveal that devices are positioned relatively near each other, a mobile device may reveal an absolute location based on GPS data, and/or an infrared presence sensor may reveal that the user is sitting in front of a device. An intelligent system may assemble these individual pieces of telemetry into a broader knowledge graph based on the absolute and/or relative locations of the user's devices, the location of the user in relation thereto, and/or characteristics of the devices. This knowledge graph may be updated in real time and/or based on changes in device telemetry.

According to one embodiment, a method for execution by an information handling system, such as a hub device, includes setting, by an information handling system through a wireless connection to a gaming controller, a plurality of light sources of the gaming controller to a respective plurality of light settings; receiving, by the information handling system, image data capturing the plurality of light sources set to the plurality of light settings; and calibrating, by the information handling system, the plurality of light sources by comparing a first portion of the image data corresponding to a first light source of the plurality of light sources to a second portion of the image data corresponding to a second light source of the plurality of light sources, and adjusting at least one of the plurality of light settings, based on comparing the first portion of the image data to the second portion of the image data.

In certain embodiments, the first portion of the image data corresponding to the first light source of the plurality of light sources and the second portion of the image data corresponding to the second light source of the plurality of light sources are determined by an image recognition artificial intelligence.

In certain embodiments, calibrating, by an information handling system, the plurality of light sources further comprises, prior to adjusting at least one of the plurality of light settings, determining an estimated adjustment for at least one of the plurality of light settings. In some such embodiments, the estimated adjustment is determined using a calibrating artificial intelligence.

In certain embodiments, calibrating, by an information handling system, the plurality of light sources further includes receiving, by the information handling system, updated image data capturing the plurality of light sources adjusted based on the plurality of light settings; determining, from the updated image data, whether additional calibration is required; and, if additional calibration is required, repeating the steps for calibrating the plurality of light sources until no additional calibration is required.

In certain embodiments, the plurality of light settings include at least one of the following: a brightness setting, a color setting, a timing setting, or a context setting.

In certain embodiments, after adjusting at least one of the plurality of light settings, information relating to the plurality of light settings may be stored in a database.

The method of certain embodiments may be embedded in a computer-readable medium as computer program code comprising instructions that cause a processor to perform operations corresponding to the steps of the method. In some embodiments, the processor may be part of an information handling system including a first network adaptor configured to transmit data over a first network connection; and a processor coupled to the first network adaptor, and the memory.

As used herein, the term "coupled" means connected, although not necessarily directly, and not necessarily mechanically; two items that are "coupled" may be unitary with each other. The terms "a" and "an" are defined as one or more unless this disclosure explicitly requires otherwise. The term "substantially" is defined as largely but not necessarily wholly what is specified (and includes what is specified; e.g., substantially parallel includes parallel), as understood by a person of ordinary skill in the art.

The phrase "and/or" means "and" or "or". To illustrate, A, B, and/or C includes: A alone, B alone, C alone, a combination of A and B, a combination of A and C, a combination of B and C, or a combination of A, B, and C. In other words, "and/or" operates as an inclusive or.

Further, a device or system that is configured in a certain way is configured in at least that way, but it can also be configured in other ways than those specifically described.

The terms "comprise" (and any form of comprise, such as "comprises" and "comprising"), "have" (and any form of have, such as "has" and "having"), and "include" (and any form of include, such as "includes" and "including") are open-ended linking verbs. As a result, an apparatus or system that "comprises," "has," or "includes" one or more elements possesses those one or more elements, but is not limited to possessing only those elements. Likewise, a method that "comprises," "has," or "includes," one or more steps possesses those one or more steps, but is not limited to possessing only those one or more steps.

The foregoing has outlined rather broadly certain features and technical advantages of embodiments of the present invention in order that the detailed description that follows may be better understood. Additional features and advantages will be described hereinafter that form the subject of the claims of the invention. It should be appreciated by those having ordinary skill in the art that the conception and specific embodiment disclosed may be readily utilized as a basis for modifying or designing other structures for carrying out the same or similar purposes. It should also be realized by those having ordinary skill in the art that such equivalent constructions do not depart from the spirit and scope of the invention as set forth in the appended claims. Additional features will be better understood from the following description when considered in connection with the accompanying figures. It is to be expressly understood, however, that each of the figures is provided for the purpose of illustration and description only and is not intended to limit the present invention.

BRIEF DESCRIPTION OF THE DRAWINGS

For a more complete understanding of the disclosed system and methods, reference is now made to the following descriptions taken in conjunction with the accompanying drawings.

DETAILED DESCRIPTION

Figure 1:
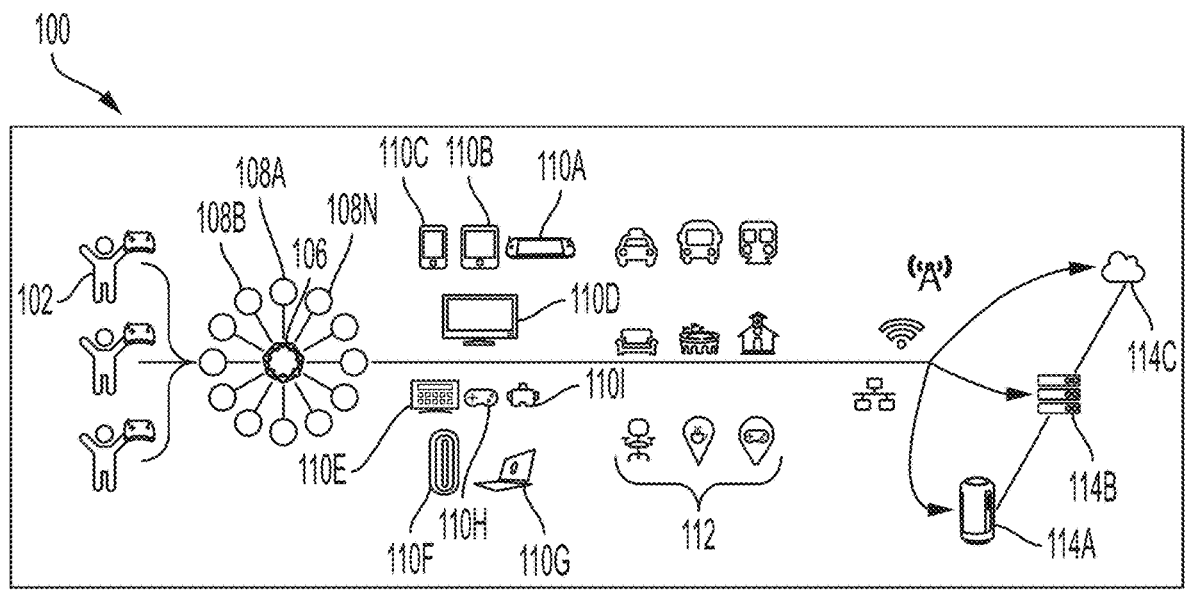
FIG. 1 is a block diagram illustrating aspects of a configurable system for providing services to users according to some embodiments of the disclosure.

These example embodiments describe and illustrate various aspects of a configurable and dynamic gaming environment that can be supported through the use of a hub device, which may be an information handling system. A hub device may be located in a user's home and used to arrange game play sessions (or more generically application sessions) between host devices and services. The host devices may execute an application for receiving an AV stream for displaying rendered content from a game play session (or other application session), and in some configurations also receive user input for interacting with the session from a peripheral device, such as a gaming controller. The AV stream presented by the host device may be generated by a service. The service may execute on the hub device or another information handling system, such as a cloud computing resource. A home may include one or several host devices (e.g., televisions, mobile computers, tablet computers, and personal computers) and may include one or several information handling systems executing the service (e.g., a hub devices and personal computers).

A user may interact with the service through a wireless controller. The wireless controller may include one or more lighting devices that engage with the user to enhance their experience while interacting with the dynamic gaming environment. The environment may also include other wireless controllers associated with other users, which may also include lighting devices. Further, the environment around the user may also include lighting devices. Embodiments described herein may be applied by one or a combination of the wireless controller, the hub device, a user's mobile device, or other information handling systems. The embodiments provide techniques for calibrating and/or synchronizing lighting devices on a wireless controller, between wireless controllers, and/or between one or more wireless controllers and/or other lighting devices in the environment. Coordinated and calibrated lighting devices within the environment enhance the user's experience when interacting with the dynamic gaming environment. For example, calibrated colors between lighting devices improve consistency of color and/or brightness and improve immersion of the user within the environment.

The user's home may be divided into different environments defined by a space around a host device. For example, a living room with a television may be one environment and a bedroom with a personal computer may be another environment. A user may use a peripheral device in one of the environments and the hub device may configure a host device, a service, and the peripheral device for operation in the environment by determining the corresponding environment using a knowledge graph. The knowledge graph provides a database of historical information about the environments from which the hub device may use current characteristics of the peripheral device to deduce the location, and thus current environment, of the peripheral device. For example, the knowledge graph may include information about location of rooms (e.g., environments) in the house based on wireless signatures of devices within the different rooms. This difference in signatures reflects that a device located on one side of the house may receive beacon signals from different neighboring access points than a device on an opposite side of the house. When a user carries the peripheral device around the house, the hub device may determine a location of the peripheral device based on visible access points to the peripheral device. Other example characteristics beyond wireless signature for determining location are described in further detail below, and the knowledge graph may be used to combine different characteristics to identify the location, and thus environment, of the peripheral device.

Based on the location of the peripheral device determined from the knowledge graph, the hub device may initialize an application session for the peripheral device by determining an appropriate host device and service for the application session. For example, if the peripheral device is in the living room and is requesting a game that is within the capabilities of the service on the hub device to execute, the hub device may initialize an application session for the peripheral device between the television as a consumption device and the hub device as a service. The service on the hub device executes the game and streams rendered content to an application executing on the television consumption device.

The hub device may be used to migrate the peripheral device to a different environment and/or migrate the application session between host devices and/or services. For example, initially the application session may use a communication link between the peripheral device and the television host device for receiving user input, in which the application executing on the television host device relays user input to the service through a backhaul communication link from the television host device to the hub device. During the application session, the hub device may monitor characteristics of the peripheral device, including signal strength of connection to other components, and determine that the communication link from the peripheral device to the hub device is stronger than the communication link from the peripheral device to the television host device. The hub device may migrate the peripheral device to a communications link with the hub device such that the service executing on the hub device directly receives the user input but the streaming session continues from the service to the application executing on the television host device. Such a change is illustrated in the change in configuration from FIG. 3A to the configuration of FIG. 3B described in further detail below.

Other aspects of the application session may also be migrated. For example, if the peripheral device is determined to move to a different environment, then the hub device may migrate the application session to an application executing on a host device within the new environment. As another example, if a connection between the television host device and the service becomes unstable, the hub device may recommend and/or initiate a migration of the application session to a different host device. One scenario for such a migration may be where the television host device is connected through a wireless link to the service in which the wireless link quality is reducing quality of the streaming and a second host device with a wired connection is available in a nearby environment. Each of these example migrations may be determined based on information in the knowledge graph regarding locations of environments and capabilities within those environments. As yet another example, a user may request execution of an application, such as a particular game, during the application session for which a better configuration exists than the current host device and/or current service. The request for a different application, such as a game requiring a certain GPU capability, may cause the hub device to determine that a second device executing a second service is better for hosting the application and migrate the peripheral device to the second service by, for example, reconfiguring network connections.

The hub device may support connecting to multiple peripheral devices. In one example, the hub device may support two peripheral devices using a shared session on one host device to play the same or different games on the host device. In another example, the hub device may support two peripheral devices in different environments using different sessions with different host devices. The hub device may determine the environment of each of the peripheral devices based on characteristics of the device and the knowledge graph and configure application session for each of the peripheral devices accordingly. Different arrangements of peripherals and players may be supported. For example, one hub device executing a service and one host device executing an application can support a configuration with Game A and one player (P1) with peripheral (C1) and Game B and one player (P2) with peripheral (C2); or can support a configuration with Game A and one player (P1) with peripheral (C1) and Game A and one player (P2) with peripheral (C2); or can support a configuration with Game A and two players (P1, P2) with peripherals (C1, C2).

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

FIG. 1 is a block diagram illustrating aspects of a configurable system for providing services to users according some embodiments of the disclosure. A system 100 includes users 102 who may have access to a shared library of applications 106 including applications 108A-108N. The users 102 may have separate libraries, with some overlapping applications between the libraries. The users 102 may access the library 106 through devices 110A-I, such as mobile gaming device 110A, tablet computing device 110B, phone computing device 110C, television 110D, personal computing device 110E, desktop computing device 110F, laptop computing device 110G, game controller 110H, VR headset 110I. The devices 110 may access services at any of locations 112, including cars, busses, homes, hotels, offices, parks, etc. One or more of the devices 110 may communicate with an application session executing on a computing device 114, such as a home application hub 114A, a server 114B, or a cloud execution environment 114C. In some embodiments, environments may only exist for fixed devices, e.g., desktop computers, televisions, etc.

Figure 2:
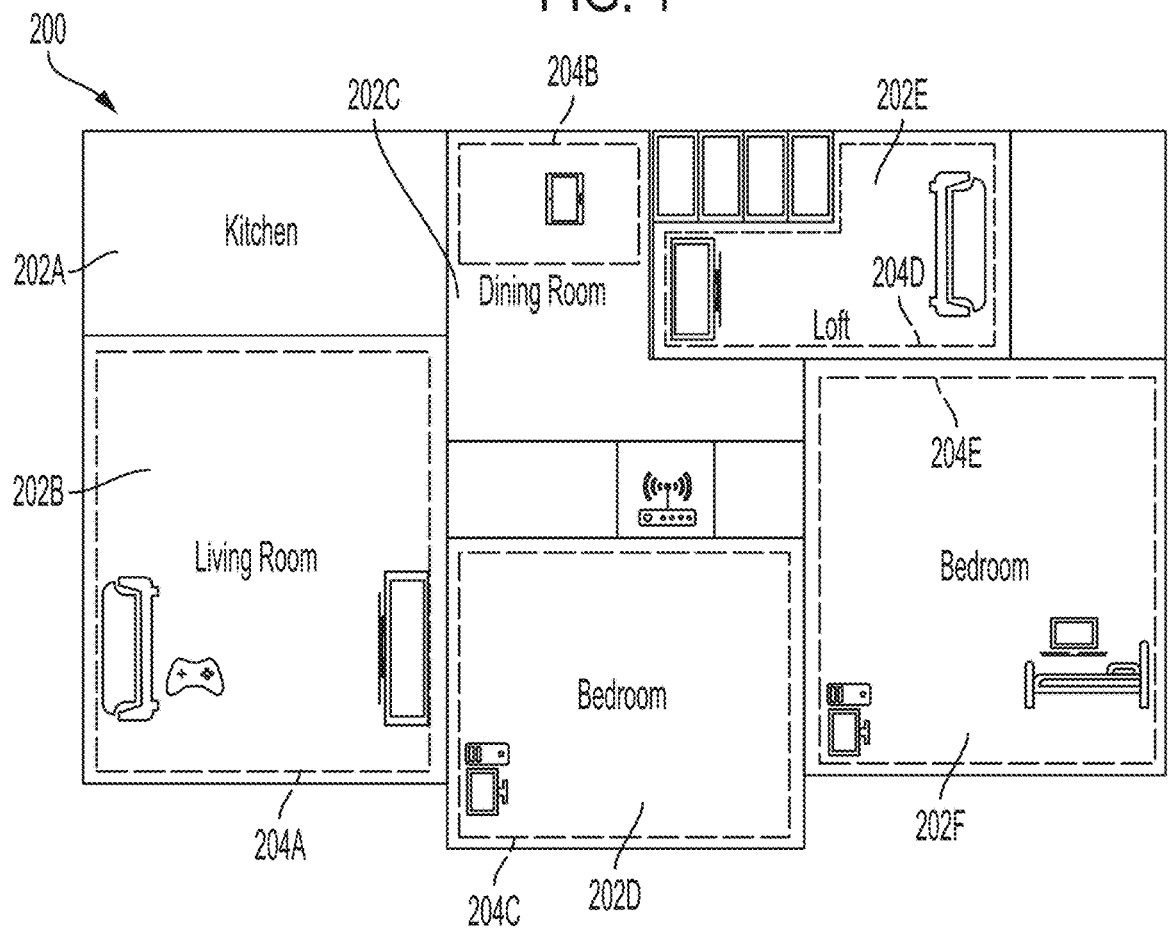
FIG. 2 is a block diagram illustrating possible game environments according to some embodiments of the disclosure.

FIG. 2 is a block diagram illustrating possible game environments according to some embodiments of the disclosure. A user's home 200 may include rooms 202A-F, and each of the rooms may have different information handling systems present, different AV equipment present, and/or different characteristics. For example, a living room 202B may include a large-size television, a bedroom 202D may include a personal computer, and a dining room 202C may include a table computing device. Gaming environments 204A-E in the home 200 may be defined based on spaces where a user is likely to execute an application session. Each gaming environment 204A-E may include numerous devices and gaming environments, devices that may or may not be capable of hosting games, and/or devices that may or may not be capable of receiving game output. A system 100 may allow multiple users in the home 200 to simultaneously execute an application session. In some embodiments, multiple games may be hosted on a single device. In some embodiments, multiple games may target a single output device. In some embodiments, where games should be hosted, where game output should go, and how to best route peripheral I/O for users are managed.

A user may move between gaming environments 204A-E within the home 200 and continue an application session. For example, a user may take a device, such as a gaming controller, from environment 204A to environment 204C. The gaming controller may migrate and reconfigure for operation in environment 204C from a configuration for environment 204A. For example, the controller may transition from an application hosted on a TV in living room 202B to an application hosted on TV in dining room 202C while remaining connected to a host service executing on a PC in bedroom 202D.

Figure 3A:
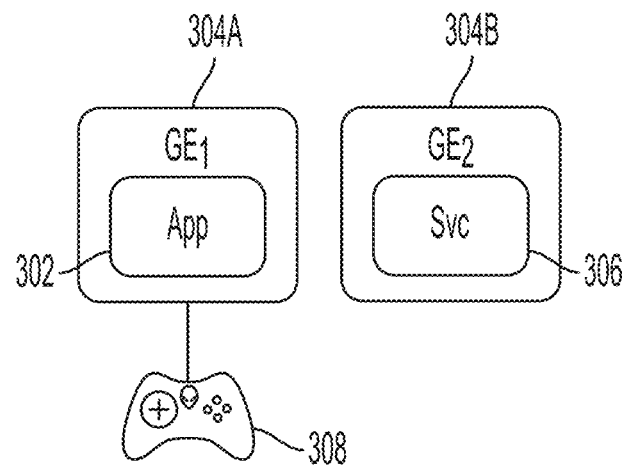
FIG. 3A is a block diagram illustrating application and services hosted in different gaming environments according to some embodiments of the disclosure.

Example configurations for applications and services in gaming environments are shown in FIGS. 3A-3D. FIG. 3A is a block diagram illustrating application and services hosted in different gaming environments according to some embodiments of the disclosure. In FIG. 3A, a first gaming environment 304A may include a device, such as a TV or PC, hosting an application 302, which is an endpoint for an application session such as a gaming session. The application 302 communicates with a service 306, which may be hosted on a device in a different gaming environment 304B. A controller 308 may communicate with the application 302 to receive user input for the application session to control, for example, a character in a game. In some embodiments, the controller 308 is connected to the environment 304A hosting the application and the I/O is configured to be relayed to the environment 304B hosting the actual game.

Figure 3B:
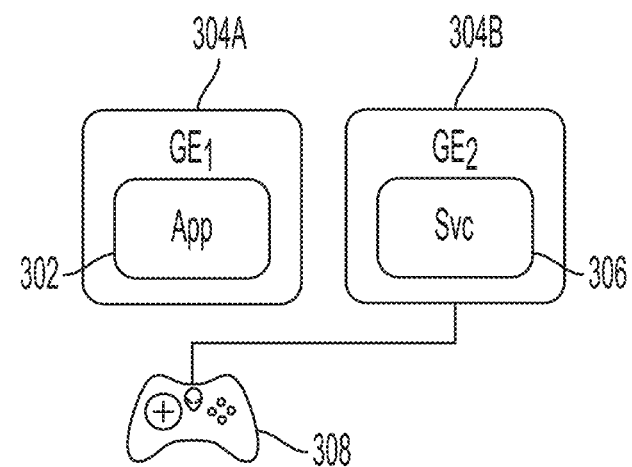
FIG. 3B is a block diagram illustrating application and services hosted in different gaming environments according to some embodiments of the disclosure.

Another arrangement for the application and service is shown in FIG. 3B. FIG. 3B is a block diagram illustrating application and services hosted in different gaming environments according to some embodiments of the disclosure. In FIG. 3B, the controller 308 communicates with the service 306 for providing user input to an application session, with the AV rendering target of the application session being application 302 in a different gaming environment.

Figure 3C:
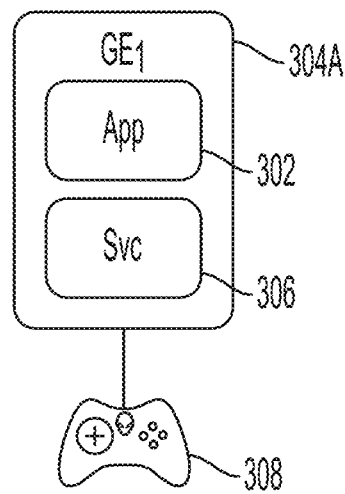
FIG. 3C is a block diagram illustrating application and service hosted in a common gaming environment according to some embodiments of the disclosure.

Another arrangement for the application and service is shown in FIG. 3C. FIG. 3C is a block diagram illustrating application and service hosted in a common gaming environment according to some embodiments of the disclosure. In FIG. 3C, the application 302 and the service 306 are executed in the same gaming environment 304A, which may be a single device, two devices, or a combination of devices in the gaming environment 304A. The controller 308 may communicate with the service 306 and/or the application 302.

Figure 3D:
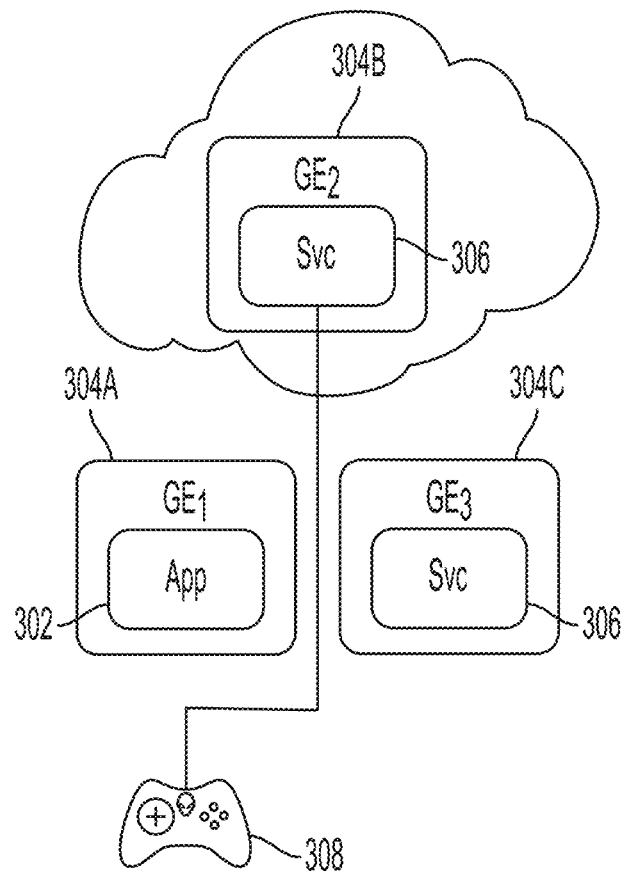
FIG. 3D is a block diagram illustrating a cloud-based service arrangement for a gaming environment according to some embodiments of the disclosure.

A further arrangement for the application and service is shown in FIG. 3D. FIG. 3D is a block diagram illustrating a cloud-based service arrangement for a gaming environment according to some embodiments of the disclosure. In FIG. 3D, the controller 308 may communicate with a service 306 hosted in a gaming environment 304B that is remote from the gaming environment 304A in which the application 302 is executing. The service 306 may be executing, for example, on a remote device, such as when the user's home includes the gaming environment 304B but the user is engaging with application 302 at a location on a different network from their home (e.g., at a friend's house). The service 306 may also or alternatively be executed, for example, on a cloud computing device available as a subscription service to the user.

Figure 4A:
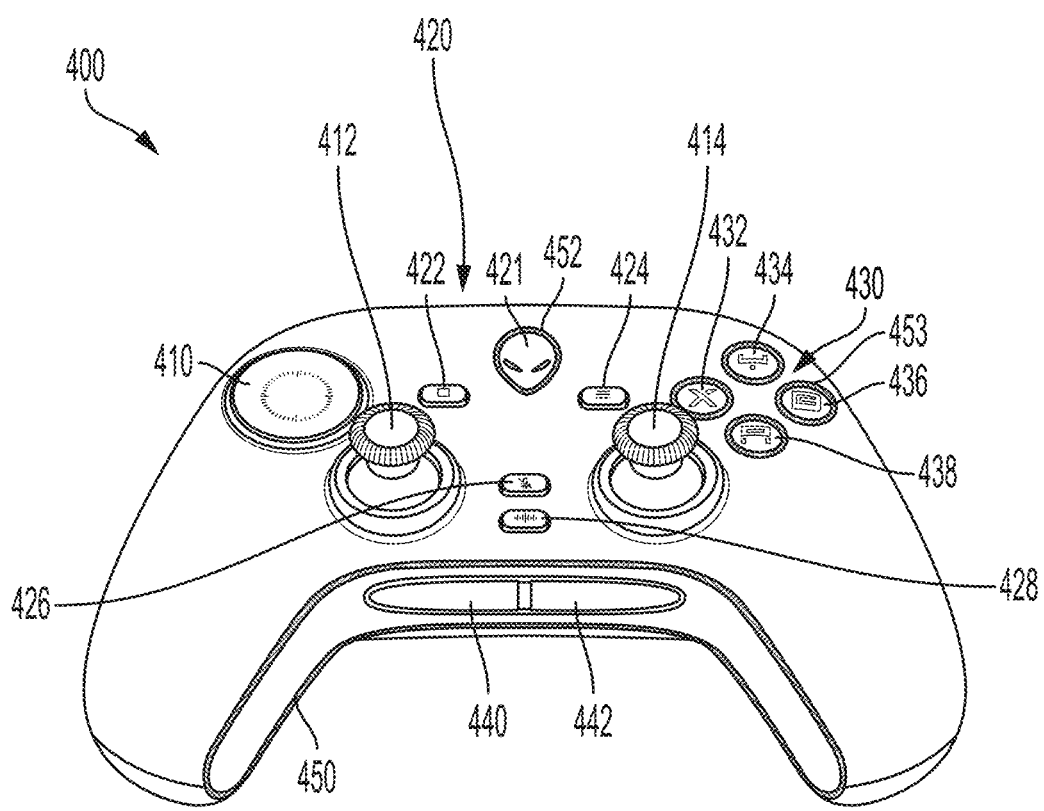
FIG. 4A is a diagram of a gaming controller according to some embodiments of the disclosure.

Reference is now made to FIG. 4A, which shows a gaming controller 400 according to some aspects of this disclosure. Gaming controller 400 may be an example embodiment of controller 308 discussed above with respect to FIGS. 3A to 3D. Gaming controller 400 may include a directional controller 410, a first joystick 412, a second joystick 414, a plurality of control buttons 420, including a power button 421, a first control button 422, a second control button 424, a third control button 426, and a fourth control button 428, a plurality of gaming buttons 430, including gaming buttons 432, 434, 436, and 438, a first scroll wheel 440, a second scroll wheel 442, and a plurality of light sources, including light ring 450, power button light 452, and gaming button lights 453.

In some exemplary aspects, the directional controller 410 may be coupled to sensors to detect when a user touches, moves, and/or puts pressure on the directional controller 410. In some aspects, directional controller 410 may be configured to control aspects of a gaming application. For example, directional controller 410 may be configured to control the movement and/or camera angle of a character in a gaming application. In some aspects, directional controller 410 may include haptic devices.

The gaming controller may include a first joystick 412. The gaming controller may include a second joystick 414. In some aspects, first joystick 412 and/or second joystick 414 may be configured to control aspects of a gaming application. For example, first joystick 412 and/or second joystick 414 may be configured to control the movement and/or camera angle of a character in a gaming application. In other examples, first joystick 412 and/or second joystick 414 may be configured to perform navigation tasks within a gaming application, such as within and/or between menu screens of a gaming application. In some aspects, first joystick 412 and/or second joystick 414 may include haptic devices. In some aspects, first joystick 412 and/or second joystick 414 may be configured to adjust lighting settings for the gaming environment and/or the gaming controller 400. For example, first joystick 412 and/or second joystick 414 may be configured to adjust the light settings of a room in the gaming environment. As an additional or alternative example, first joystick 412 and/or second joystick 414 may be configured to adjust the light settings of light sources on the gaming controller 400.

The gaming controller 400 may include a plurality of control buttons 420, including power button 421, a first control button 422, a second control button 424, a third control button 426, and a fourth control button 428. In some aspects, the control buttons may be configured to control aspects of a gaming environment, aspects of a gaming application, and/or aspects of the gaming controller 400 itself. For example, one of the control buttons 420 may be configured to cause the gaming controller to connect to a wireless network. One of the plurality of control buttons 420, for example, control button 426, may be configured to enable and/or disable a microphone. Other functionalities for the control buttons 420 may include, as nonlimiting examples, pausing an application, opening or closing a graphical user interface (e.g., a menu, map, or inventory display) in an application, closing an application, adjusting settings for the gaming controller 400, adjusting light settings for a gamine environment, and/or initiating a calibration process for light sources on the gaming controller 400.

In some aspects, the function of a given control button of the plurality of control buttons 420 may depend on a context. Nonlimiting examples of a context can include an application running on an information handling system, which user is using the gaming controller 400, and/or the location of the gaming controller 400 in a gaming environment (e.g., a room in a user's home). In some aspects, a context may be defined by a user.

The power button 421 may be configured to power on the gaming controller 400. In some aspects, the power button 421 may include a biometric sensor (e.g., a fingerprint sensor). In some implementations, the biometric sensor may be configured to perform ultra-sonic fingerprint recognition. In aspects in which the power button 421 includes a biometric sensor, the gaming controller 400 may be configured to associate biometric information with a particular user or user profile.

The gaming controller 400 includes a plurality of gaming buttons 430, including gaming buttons 432, 434, 436, and 438. The gaming buttons 430 may be configured to control aspects of a gaming environment, aspects of a gaming application, and/or aspects of the gaming controller 400 itself. For example, the gaming buttons 430 may be associated with particular actions in a gaming application. The gaming buttons may also be used in navigating within an application (e.g., in a menu or other graphical interface of an application), and/or in establishing an application session.

Gaming controller 400 may include a plurality of scroll wheels, including scroll wheel 440 and scroll wheel 442. Scroll wheels 440 and 442 may be configured similarly to the control buttons 420 and/or gaming buttons 430. For example, they may be employed in configuring aspects of the gaming controller 400. They may also include context-specific functionality. In some aspects, the scroll wheels 440 and 442 may manually configure light sources on the gaming controller 400.

The gaming controller 400 may include a plurality of light sources. For example, gaming controller 400 may include light ring 450, power button light 452, and gaming button lights 453. In some aspects, the light sources may be disposed on or inside the gaming controller 400.

In some aspects, the light sources may be coupled to respective light guides. Light guides can serve to spread light output from a light source out over a distance. Light guides can diffuse the intensity of light output by a light source. For example, light guides can be made of a translucent material such as a translucent plastic. This can result in a smoother light output over an area. Light guides may also reduce the need for additional light sources to transmit light over an area by spreading out the light output from a single light source, which can result in greater efficiency.

The light sources may be LEDs. LEDs have numerous advantages. For example, LEDs often use lower energy consumption than other light sources, can be configured to output several different colors, are relatively inexpensive to manufacture and integrate into electronic circuits, and can be controlled digitally. In some instances, LEDs can have their brightness and/or color manipulated by pulse width modulation (PWM). In some embodiments, the LEDs may be RGB (red-green-blue) LEDs.

The light sources of gaming controller 400 may be configured to provide experiential lighting. Experiential lighting may enhance a user's experience using the gaming controller 400 and/or the information handling system. Experiential lighting may provide for aesthetic light arrangements on controller 400.

Experiential lighting may also be functional and allow for light sources on the controller 400 to enhance a user's immersive experience with a gaming application. For example, light sources may be used to improve tutorials in gaming applications by illuminating buttons to be used for particular in-game actions. As another example, light sources may be used to provide a user with information about a given scenario in a gaming application. For example, light sources may be configured to light up red and/or flash when a character in a gaming application takes damage, or to pulse a warning orange if danger is near. Experiential lighting may include coordinating light sources on the controller 400 with the graphical display of a gaming application and/or with haptic devices in the controller 400.

A user's experience may be degraded when a light color used in one set of light sources does not match the color of one of the other light sources, especially if the light sources are intended to be the same color (e.g., both are outputting red light, but the hue or shade of red does not match). Variations in manufacturing of light guides and/or light sources can mean that the same color values input to a light source can appear to be different from each other. Light sources may also appear different in different gaming environments (e.g., because of differences in external or ambient lighting). Similarly, a user's experience may be degraded if the timing and/or brightness of light sources is not aligned.

Embodiments of this disclosure provide color, brightness, and/or timing matching between separate light sources on the gaming controller 400. Experiential lighting may include light sources on the gaming controller that coordinate with the lighting of a gaming environment (e.g., by matching color with the lighting of gaming environment or complementing the color of the lighting in a gaming environment). Experiential lighting may also include light sources that adjust dynamically to changes in a gaming environment. In some aspects, experiential lighting may allow for synchronized light color shifts or multicolor light coordination between separate light sources on gaming controller 400. In some implementations, a user may choose to customize settings related to whether and/or how light sources output light. Experiential lighting may include predefined color settings and/or palettes for a user to select from.

Gaming controller 400 may include a light ring 450. Light ring 450 may be arranged to outline a perimeter or part of a perimeter of a surface of the gaming controller 400. Light ring 450 may include light sources on a flexible printed circuit (FPC). Light ring 450 may include a light guide coupled to the light sources. In some aspects, the light ring 450 may include two or more FPCs. In aspects including more than one FPC, each of the FPCs may be coupled to a respective light guide. In some implementations, the light sources may be spaced evenly. For example, the number of light sources to obtain a visually continuous light can be reduced by spacing the light sources evenly with a separating distance designed to match the light spreading capability of a light guide. In some embodiments, a light ring 450 may include two FPCs (e.g., one for each half of light ring 450). In some such examples, each of the FPCs may include between 18 and 24 LEDs.

In the gaming controller 400, the power button 421 may include a power button light 452. Power button light 452 may include a light guide. In some implementations, the light guide may be arranged across a surface of the power button 421. In some implementations, the light guide may surround the power button 421. In some implementations, the whole power button 421 may serve as the light guide for the power button light 452. In some particular implementations, the power button light 452 may contain between 2 and 4 LEDs and one light guide. In some aspects, the power button light 452 may be a reference light source. This may mean that other light sources on the gaming controller 400 are configured and/or calibrated based on the power button light 452. For example, calibration processes may be performed so that other light sources appear to output light at the same color, brightness, and/or frequency (e.g., if the power button light 452 is flashing in some sequence, other light sources may be calibrated to sync their rate of flashing to the power button light 452).

Gaming controller 400 may include gaming button lights 453. Gaming button lights 453 may include light sources for each of the plurality of gaming buttons 430. The gaming button lights 453 may include a light guide. In the case that the gaming button lights 453 include light sources for each of the plurality of gaming buttons 430, each of the plurality of gaming buttons 430 may include a respective light guide.

In some implementations, the gaming button lights 453 may be configured to surround the perimeter of each of the gaming buttons 430 (e.g., as a separate ring of lights surrounding each individual gaming button of the plurality of gaming buttons 430). In some implementations, the gaming button lights 453 may be configured to encompass all of the gaming buttons 430 at a time within the same shape. In some implementations the gaming button lights 453 may be arranged inside and/or under each of the gaming buttons 430. For instance, in some example implementations of the present disclosure, each of the plurality of gaming buttons 430 may include a button cap. The button cap may be transparent, translucent, partially transparent, or partially translucent. For example, the button cap may include a letter or a symbol, and the letter or symbol can be transparent or translucent. In some implementations, the button cap of each of the gaming buttons 430 may be disposed over a light source. In these implementations, the transparent and/or translucent portion of the button may act as a light guide for the light source(s). In some embodiments, there may be four gaming buttons, and each gaming button may include at least one light source.

In addition to the configurations for light sources illustrated in gaming controller 400, as discussed above, there may be other configurations of light sources available. For example, light sources may be configured to correspond to the directional controller 410, either or both of joysticks 412 and 414, and/or the controller buttons 420.

Gaming controller 400 may include additional or alternative features that may not be shown in FIG. 4, nonlimiting examples of which may include buttons, triggers, toggles, switches, scroll wheels, bumpers, touch pads, pressure sensors, light sensors, haptic devices, microphones, wireless antennas, charging ports, resistive motors, and/or other components.

Figure 4B:
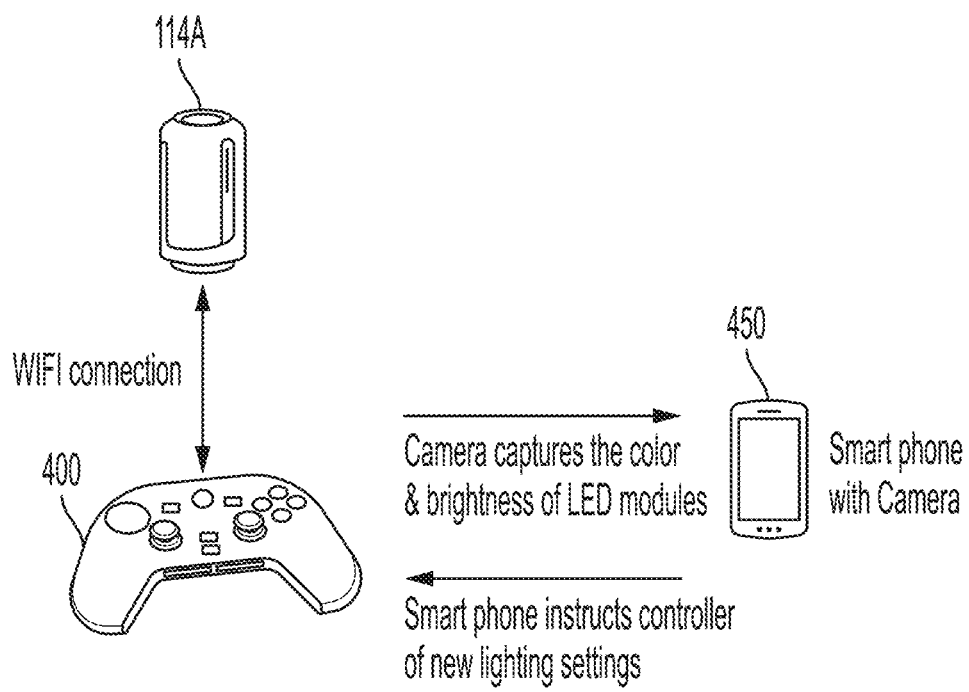
FIG. 4B is a diagram of a calibration process for lighting devices of a gaming controller in a dynamic gaming environment according to some embodiments of the disclosure.
Figure 4C:
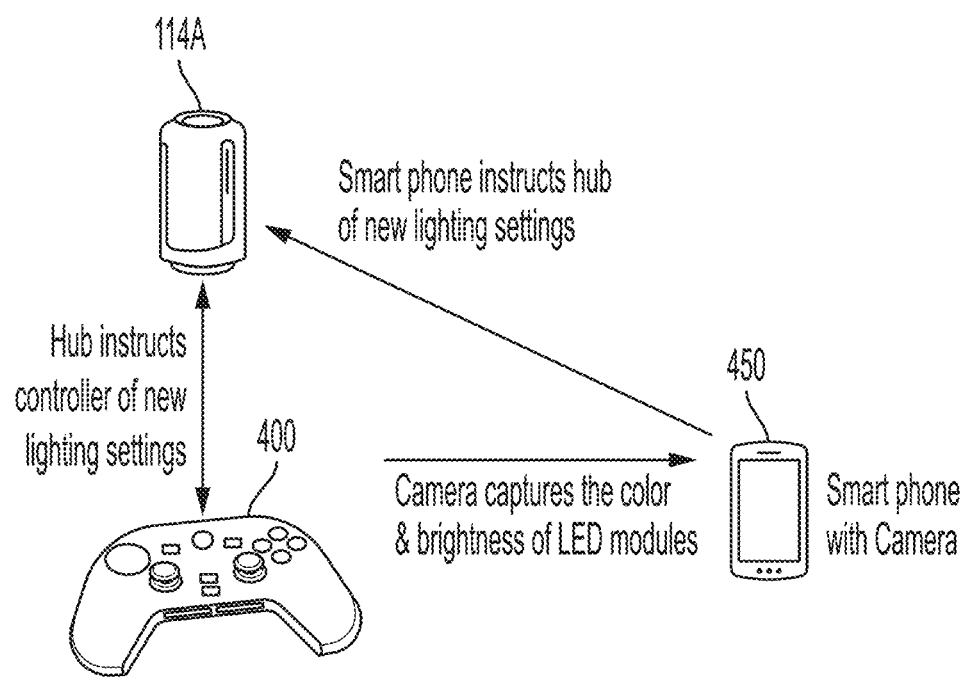
FIG. 4C is a diagram of a calibration process for lighting devices of a gaming controller in a dynamic gaming environment according to some embodiments of the disclosure.

Techniques in embodiments of this disclosure allow calibration of the lighting sources. Example configuration techniques are shown in FIG. 4B and FIG. 4C. FIG. 4B is a diagram of a calibration process for lighting devices of a gaming controller in a dynamic gaming environment according to some embodiments of the disclosure. In FIG. 4B, a smart phone 450 with camera may record image data of the controller 400 to capture the color and brightness of the lighting modules after setting them to a predetermined color and brightness. The smart phone 450 may determine new lighting settings for the controller 400 and transmit the configuration data to the controller 400. The controller 400 may then communicate with a gaming hub 114A for interacting in a dynamic gaming environment using the calibrated lighting sources.

FIG. 4C is a diagram of another calibration process for lighting devices of a gaming controller in a dynamic gaming environment according to some embodiments of the disclosure. In FIG. 4C, a smart phone 450 with camera may record image data of the controller 400 to capture the color and brightness of the lighting modules after setting them to a predetermined color and brightness. The smart phone 450 may determine new lighting settings for the controller 400 and transmit the configuration data to the gaming hub 114A, which may then instruct the wireless controller 400 to use the new configuration data. The storage of the configuration data at the hub 114A may allow the hub 114A to apply the configuration data to other controllers linked to the hub 114A and/or new controllers later associated with the hub 114A. The hub 114A may also backup the configuration data to a remote cloud server. The remote cloud server may determine characteristics of the controller 400 to associate with the configuration data, such that other users' controllers in other locations with similar characteristics may be loaded with the same configuration data, which may provide an improved default setting for the controller before that user performs their own calibration process.

Figure 5:
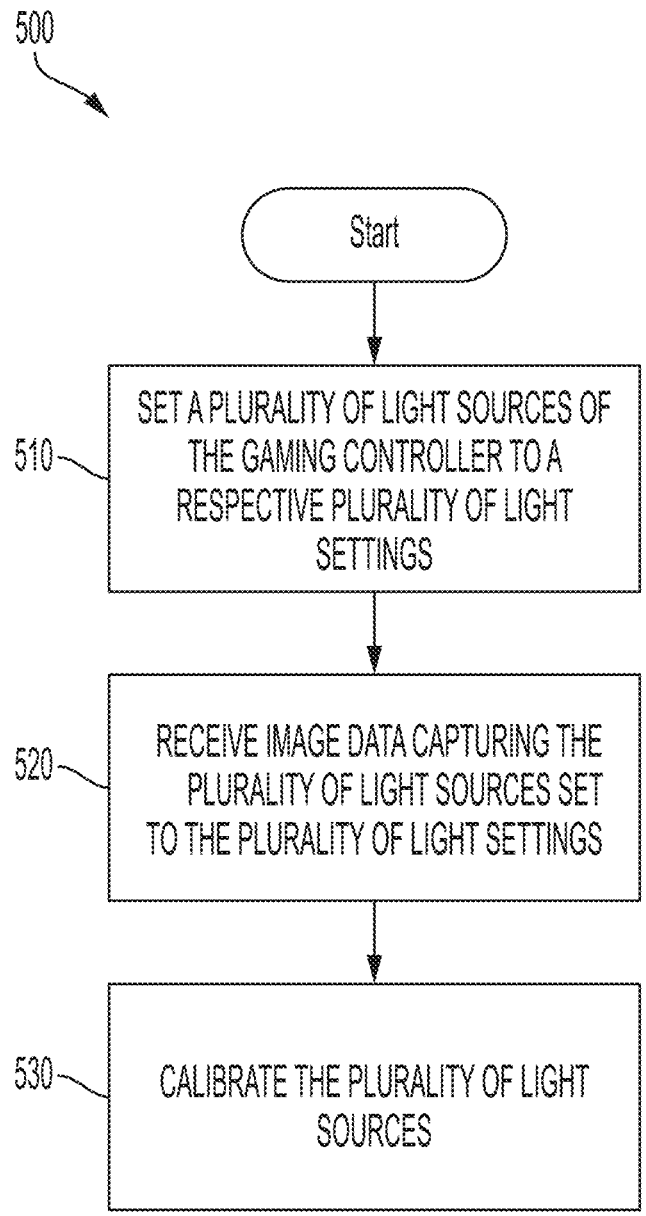
FIG. 5 is flow diagram illustrating a method of configuring light sources on a gaming controller according to some embodiments of the disclosure.

FIG. 5 is a flow diagram illustrating a method of configuring light sources on a gaming controller according to some embodiments of the disclosure. Diagram 500 illustrates a series of operations which, when performed by an information handling system, may calibrate light sources on a gaming controller. At operation 510, a plurality of light sources of the gaming controller are set to a respective plurality of light settings. In some implementations, setting the plurality of light sources of the gaming controller to the respective plurality of light settings may be done by an information handling system through a wireless connection to the gaming controller.

The plurality of light sources may include LEDs. In some implementations, the plurality of light sources may include a light source module. A light source module may include at least one light source and a light guide. In some implementations, a light source module may include two or more light sources (e.g., individual LEDs). A light source module may include a control circuit for driving the light sources and/or causing them to output light according to a plurality of light settings.

The plurality of light settings may include at least one of the following: a brightness setting, a color setting, a timing setting, or a context setting. A brightness setting may refer to the respective luminosity of a light source and/or light source module. A color setting may refer to a color output by the light source and/or light source module. For example, if the light source is an RGB LED, the color setting may refer to a color value as a combination of red, green, and blue light. In some implementations, the color setting may include or correspond to a hexadecimal color code, such as the HTML hex color codes. A timing setting may include a duration for which the light source may be illuminated, a delay time until the light source is illuminated, a frequency for switching the light source on and off, sequence and or pattern timing, a synchronization pattern, a duty cycle setting, a timeout setting, or a PWM setting.

A context setting may refer to a context in which a particular light setting may be set. A context may include aspects related to the gaming controller's physical location (e.g., within a gaming environment), the ambient lighting of the space in which the gaming controller is being used, and/or a coordination between light settings of a gaming environment and the gaming controller's light sources. A context may include a user profile, user color palette preferences, color palettes associated with a gaming application, whether a gaming application is running on the information handling system, which applications are being run, controller configurations (e.g., if light sources are disabled or not to be powered on within certain timeframes), and/or a rule-based context for light sources. Examples of rule-based contexts may include the context of a gaming application (e.g., a rule to flash a particular color during a gaming application, such as to pulse red light on the light sources of the gaming controller during a combat scenario in a gaming application) or other contexts for the controller (e.g., flash blue light when connecting to a wireless network, output solid green light when successfully paired, and so on). Another example of a context may be for distinguishing between multiple gaming controllers in use during a gaming session (e.g., configuring a first gaming controller to output yellow light, while the second gaming controller may output violet light). A context setting may also include combinations of the other settings (e.g., a combination of color, brightness, and timing settings).

Operation 520 includes receiving, by the information handling system, image data capturing the plurality of light sources set to the plurality of light settings. In some implementations, image data may be captured by a mobile device of the information handling system (e.g., a smartphone or tablet computer). Image data may be transferred to another aspect of the information handling system, such as a hub device. Alternatively or additionally, image data may be retained on the mobile device. In some aspects, image data may be captured using a camera of the mobile device. In some aspects, image data may be provided to an application on the mobile device and/or the hub device.

Operation 530 includes calibrating, by an information handling system, the plurality of light sources. In some implementations, calibrating the plurality of light sources may include comparing a first portion of the image data corresponding to a first light source of the plurality of light sources to a second portion of the image data corresponding to a second light source of the plurality of light sources. In some embodiments, the first portion of the image data corresponding to the first light source of the plurality of light sources and the second portion of the image data corresponding to the second light source of the plurality of light sources are determined by an image recognition artificial intelligence (AI). In some implementations, the first portion of the image data and the second portion of the image data may correspond to predefined areas on a gaming controller (e.g., areas encompassing features having light sources).

In some embodiments, comparing the first portion of the image data to the second portion of the image data may include indicating one of the light sources of the plurality of light sources as a reference light source. In some aspects, the light output of a target light source of the plurality of light sources may be compared to the reference light source. Such a comparison may include calculating a difference between the target light source and the reference light source. For example, a difference may be the difference in color, brightness, and/or timing of the two light sources. In some instances, the difference between the light settings of a reference light source and a target light source may be determined by a calibration AI.

Calibrating the plurality of light sources may include adjusting at least one of the plurality of light settings, based on comparing the first portion of the image data to the second portion of the image data. In implementations involving a reference light source and a target light source, the light settings of the target light source may be adjusted to bring the target light source into the same range of output light color, brightness, and/or timing as the reference light source. For example, it may be determined that the difference between the target light source and the reference light source can be reduced if the target light source increases the amount of blue light by some determined amount. In this example, the light settings of the target light source can then be adjusted to increase the amount of blue light by the determined amount, bringing the target light source to match the reference light source in light output.

In some aspects, at least one of the plurality of light settings may be adjusted based on a lighting configuration in an environment. For example, the at least one of the plurality of light settings may be adjusted based on external lighting, ambient lighting, environmental lighting, and/or lighting in a gaming environment. In some situations, the lighting in a gaming environment may change how a light source on a peripheral device appears to a user. In such situations, it may be desirable to adjust the light sources on the peripheral device (e.g., to cause the light sources to have increased contrast in the gaming environment, to cause the light sources to better match the lighting in a gaming environment, and/or to increase or decrease the brightness of the light sources relative to the gaming environment). In some implementations, external lighting may be captured in the image data. For example, the lighting in a gaming environment may be detected and/or measured from a portion of the image data. In some implementations, the adjustments made to the plurality of light settings may factor the influence of lighting in a gaming environment on how light from the light sources is affected.

Alternatively or additionally, in some implementations, the external lighting in a given gaming environment may be configured at and/or known by the hub device discussed previously. In some such implementations, the hub device may be able to determine the location of a peripheral device within the gaming environment. For example, when a user carries the peripheral device (e.g., a gaming controller) between gaming environments, the hub device may determine a location of the peripheral device based on visible access points to the peripheral device. The location of the peripheral device may also factor into the calibration of the light sources. For example, the hub device may transmit the location of the peripheral device to be factored in the lighting calibration. The hub device may also be able to detect and/or measure the external lighting in a given gaming environment and transmit information regarding the external lighting to the information handling system. In some implementations, the hub device and/or some other aspect of the information handling system may be able to determine the optimal lighting adjustment for the light sources.

In both the case in which the external lighting is factored into the calibration through a portion of the image data or if it is transmitted along with location information for a peripheral device from a hub device, optimal settings for calibrating a light source in a given gaming environment may be made as part of the adjustment to the at least one of the light settings.

In some aspects, calibrating, by an information handling system, the plurality of light sources may further include, prior to adjusting at least one of the plurality of light settings, determining an estimated adjustment for at least one of the plurality of light settings. In some implementations, the estimated adjustment may be determined using a calibrating AI. The calibrating AI may perform a difference calculation between the light output of a target light source and a reference light source to determine the estimated adjustment.

In some implementations, the calibrating AI may reference data from previous calibrations to determine an estimated adjustment. In some implementations, the calibrating AI may predict the estimating adjustment based on data from prior successful calibrations. Such data may have been generated from calibrations performed on other gaming controllers, calibrations performed during the manufacture of the gaming controller, calibrations of other light sources on the same gaming controller, and/or calibrations performed under different ambient lighting conditions and/or in different gaming environments. Such data may be stored in a database, and may be accessible to the information handling system at the time of calibrating the plurality of light sources.

In some aspects, calibrating the plurality of light sources may include receiving feedback information on the calibrations performed. In some implementations calibrating, by an information handling system, the plurality of light sources may include receiving, by the information handling system, updated image data capturing the plurality of light sources adjusted based on the plurality of light settings, determining, from the updated image data, whether additional calibration is required, and if additional calibration is required, repeating the steps for calibrating the plurality of light sources until no additional calibration is required. In some aspects, determining whether additional calibration is required may include determining whether the difference between the light sources and/or light source modules is within a threshold or a percent difference. In some aspects, if the difference is within the threshold or percent difference, then no further calibration or adjustment may be required. In some aspects, repeating the steps for calibrating the plurality of light sources may include performing the calibration on a different light setting. For example, if a first calibration was performed on a color setting, a second calibration may be performed on a brightness setting or a timing setting. Alternatively, multiple light settings may be configured at a single time.

In some implementations, updated image data may be captured, transmitted, and/or received by the information handling system. The updated image data may be a second set of image data. For example, the updated image data may be captured after the calibrating process has completed. In some implementations, image data may be continuously transmitted during calibration. In some such implementations, continuously transmitted image data may serve as continuous feedback for the calibration process. For example, calibration of a light source may be performed as a result of image data being captured by a mobile device, wirelessly connected to the gaming controller. In some implementations, a user may be prompted to capture image data on a mobile device wirelessly connected to the gaming controller.

In some implementations, calibrating, by an information handling system, the plurality of light sources may further include, after adjusting at least one of the plurality of light settings, storing information relating to the plurality of light settings in a database. For example, the information stored in the database may include information related to the initial (e.g., pre-calibration) light settings, information related to an estimated adjustment to the light settings, information related to the final (e.g., calibrated) light settings for a light source, information related to a user profile, and/or information related to a context (e.g., a gaming environment in which the adjustment was made). The information stored on the database may be used to improve later calibrations. For example, the information stored on the database may be used to train artificial intelligences to better calibrate the light sources. The information stored on the database may also be used to better predict adjustments to be made or more accurately set thresholds for comparison. The information stored on the database may also be associated with a user profile. In some aspects, this can allow for smoother transitions between user preferences and/or configurations when more than one user has a user profile associated with a given gaming controller.

Figure 6:
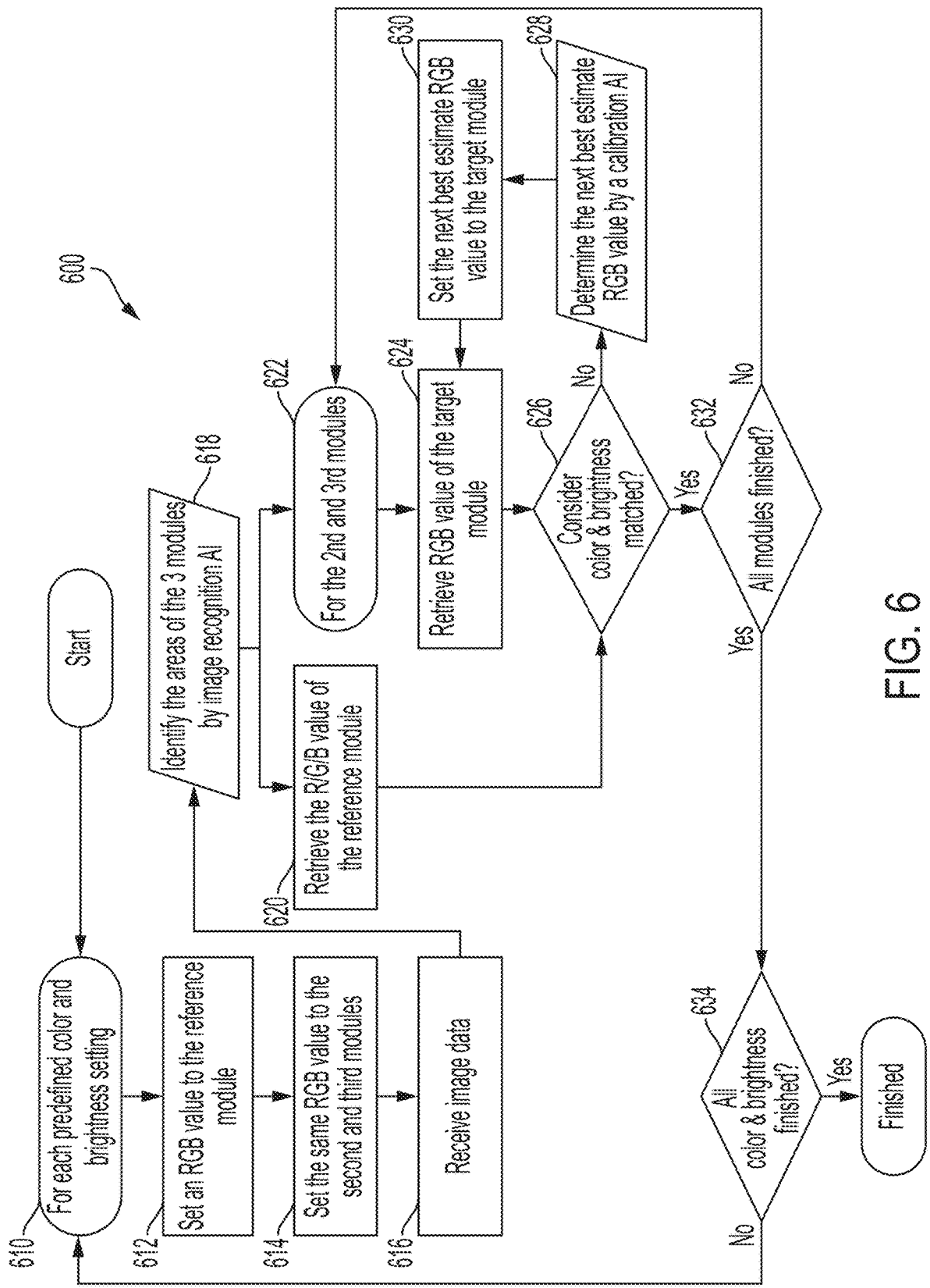
FIG. 6 is a flow diagram of an exemplary method of configuring light sources on a gaming controller according to some embodiments of the disclosure.

FIG. 6 shows a flow chart illustrating a particular example of a calibration process according to aspects of the present disclosure. FIG. 6 shows a process 600. Process 600 contemplates three light source modules: a first module, also referred to as a reference module, a second module, and a third module. Each of the modules includes at least one RGB LED capable of being adjusted at least for a brightness and color setting. Each module may also include at least one light guide. The brightness and color settings may be predefined. At step 610, the process 600 may be run for each predefined color and brightness setting. Process 600 may be run sequentially, iteratively, and/or in parallel according to the various possible implementations of the disclosure.

Operation 612 shows the step of setting an RGB value to the reference module. The RGB value may include either or both of a brightness setting and a color setting. Operation 614 shows the step of setting the same RGB value from operation 612 to each of the second module and the third module. Setting the modules to the same RGB value can provide the calibration process a common starting point. Setting the modules to the same RGB value may also provide an initial baseline for comparisons.

Operation 616 shows the step of receiving image data. The image data may be captured using a camera on a mobile device. The image data may be transmitted from a mobile device to another aspect of an information handling system. Alternatively or additionally, the image data may be processed and/or analyzed on the mobile device, such as in an application on the mobile device. The image data may contain an image of the three modules for calibration.

Operation 618 shows the step of identifying the areas of the three modules for calibration. The areas may be identified by an image recognition AI. If areas corresponding to the three modules are not identified (e.g., because they are not present or because the image data does not have sufficient resolution, contrast, and/or clarity), then new image data may be requested.

Operation 620 shows the step of retrieving the RGB value of the reference module. Operation 620 may include determining the RGB value that the reference module appears to be outputting. The output of the reference module may appear to be different from its set value based on variations in the construction of the reference module, ambient light captured in the image data, and/or other factors.

Operation 622 instructs that for each of the second and third modules, calibration steps as set out below are performed. For simplicity, the following steps refer to a target module, which may refer to either of the second or third modules, as the process 600 may require.

Operation 624 shows the step of retrieving the RGB value that the target module appears to be outputting. The output of the target module may appear to be different from its set value based on variations in the construction of the target module, ambient light captured in the image data, and/or other factors.

At determination 626, the process 600 determines whether to consider the color and brightness of the target module matched to the color and brightness of the reference module. This determination may be performed by determining a difference between the retrieved RGB value of the reference module and the retrieved RGB value of the target module. The determination may include performing a comparison of the difference to a threshold value or determining a percent difference between the two values. If the difference meets a threshold value or is within a predetermined percent difference (e.g., less than 10%, less than 5%, or less than 1% difference), then the reference module and the target module may be considered calibrated.

If the modules are not considered calibrated, then the process 600 advances to operation 628. Operation 628 includes the step of determining a next-best estimate RGB value by a calibration AI. The next-best estimate RGB value can be based on a simple difference between the target module's RGB value and the reference module's RGB value. Estimates based on a difference can be improved by using a calibration AI. The calibration AI may be, for example, an efficient color matching AI.

Operation 630 includes setting the next-best estimate RGB value to the target module. At this point, the process 600 returns to operation 624 for additional comparison and determination of whether the target module is calibrated to the reference module. Operation 624 may include, for example, receiving new image data to determine the produced color and brightness from the lighting device. From there, determination 626 and operations 628 and 630 may be repeated as necessary to calibrate the target module to the reference module. The operations may stop when the modules are calibrated within the parameters and/or thresholds used in determination 626. Alternatively, if the calibration process is taking up too much time or resources on the information handling system, it may conclude before the calibration is completely finished to promote efficiency.

Determination 632 determines whether the calibration process is complete for all modules. If the process is only complete for one of the modules (e.g., the second module), then the process 600 may return to step 622 and direct the process to calibrate the other module (e.g., the third module). If the calibration process is complete for all modules, then the process 600 proceeds to determination 634.

Determination 634 determines whether all light settings have been calibrated (in this example, it is determined whether the process 600 has calibrated for all colors and/or brightness settings). If there are still light settings to be calibrated, then the process 600 returns to step 610 to repeat the calibration process for the remaining light settings. For example, a first pass may calibrate the light modules for cyan at a given brightness setting, a second pass may calibrate the light modules for green at a given brightness setting, and the process may continue for additional predefined colors. The light settings may be calibrated for a predefined subset of color settings and/or brightness settings, rather than for every possible combination of brightness and color settings. If all light settings to be calibrated have finished, then the process 600 may complete.

In some embodiments, the method of FIG. 6 may include calibrating color and/or brightness of other wireless controllers and/or other lighting devices in the environment. For example, one lighting device in the environment or between the controllers may be configured as the reference module and other lighting devices in the environment or lighting devices on the other controller may be the target modules. The user's image device may receive image data at operation 616 corresponding to the other controllers and/or environment lighting devices.

The foregoing processes of FIG. 5 and FIG. 6 have outlined calibration techniques which may be performed by an information handling system. The techniques may be performed by, for example, a gaming hub that is wirelessly communicating with the gaming controller and a user's mobile device. The calibrations may be automated and/or performed entirely by an information handling system. For example, an application on a mobile device paired with the gaming controller may perform the automated calibration as discussed above. Color and/or brightness adjustment using an automated technique may be dynamically adjusted based on a user's environmental lighting. This may create an optimal experience for using the gaming controller in a given gaming environment. In some implementations, the location (e.g., gaming environment) may factor into the dynamic calibration of the light sources, which may lead to differently optimized calibrations in different locations. An advantage of such dynamic calibration is that it can be performed more quickly, thoroughly, and accurately than manual calibration.

However, users may desire to perform lighting calibrations and/or reconfigurations manually. For example, users may wish to associate a custom color palette with their user profiles, to set custom lighting settings for a particular gaming application, or to distinguish their gaming controller from others. In such instances, the light settings of the light sources may be desirably configured manually.

Returning to FIG. 4A, the light sources of gaming controller 400 may be configured manually. For example, one of the control buttons 420 may be configured to initiate manual adjustment of the light sources when pressed. In some implementations, a manual adjustment process may include selecting a light source or light source module (e.g., light ring 450, power button light 452, or gaming button lights 453) for adjustment with first joystick 412 and/or second joystick. For example, pointing one of the joysticks in the direction of the desired light source may select that light source. In some implementations, the light settings may be adjusted using first scroll wheel 440 and/or second scroll wheel 442. For example, first scroll wheel 440 may be configured to adjust the color setting of a selected lighting module, including a shade or hue for the color, and second scroll wheel 442 may be configured to adjust a brightness setting of the selected lighting module. To complete the manual alignment process, a user may press one of the control buttons 420 (e.g., the control button pressed to enter the manual configuration mode) or one of the plurality of gaming buttons 430.

Figure 7:
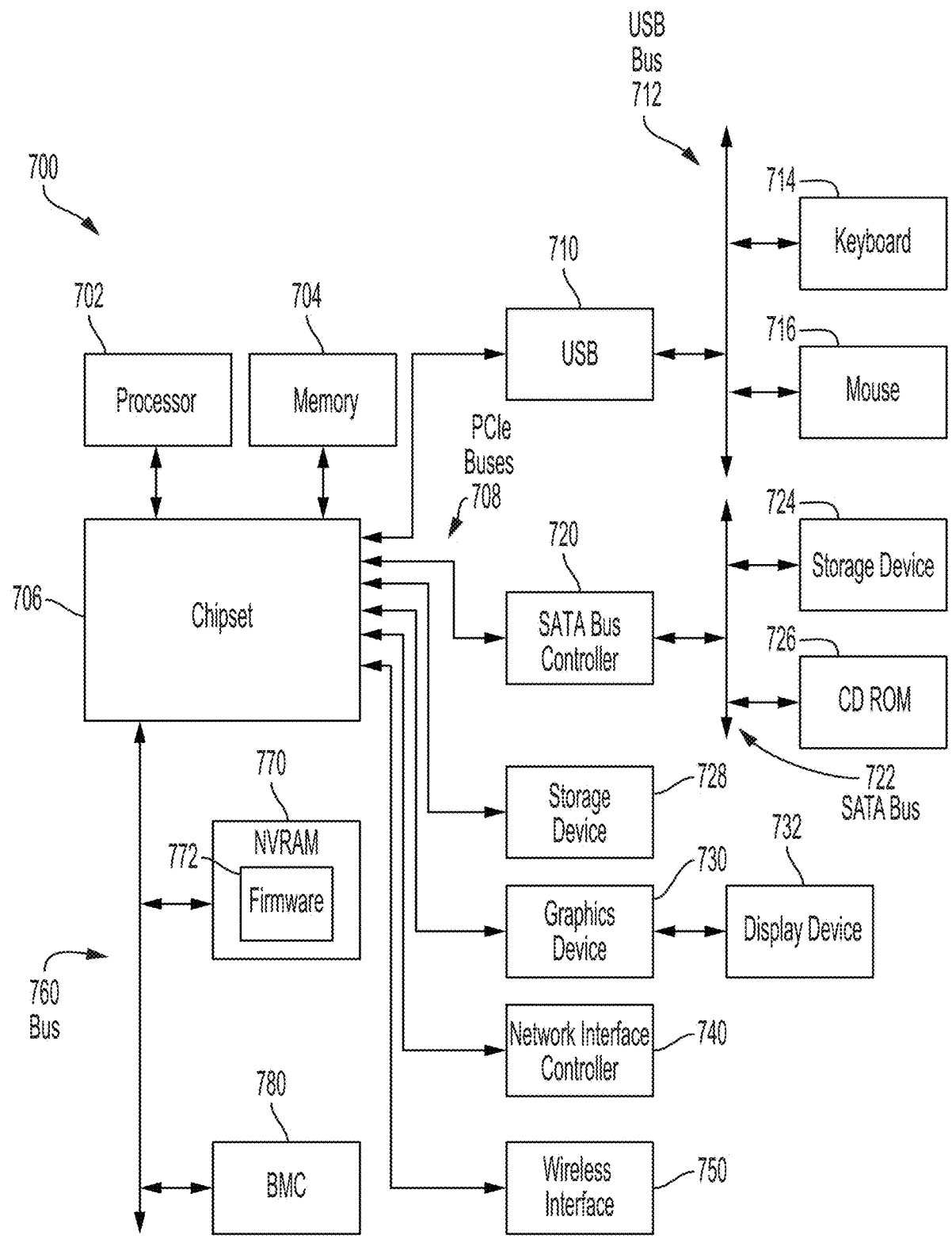
FIG. 7 is a schematic block diagram of an example information handling system according to some embodiments of the disclosure.

FIG. 7 illustrates an example information handling system 700. Information handling system 700 may include a processor 702 (e.g., a central processing unit (CPU)), a memory (e.g., a dynamic random-access memory (DRAM)) 704, and a chipset 706. In some embodiments, one or more of the processor 702, the memory 704, and the chipset 706 may be included on a motherboard (also referred to as a mainboard), which is a printed circuit board (PCB) with embedded conductors organized as transmission lines between the processor 702, the memory 704, the chipset 706, and/or other components of the information handling system. The components may be coupled to the motherboard through packaging connections such as a pin grid array (PGA), ball grid array (BGA), land grid array (LGA), surface-mount technology, and/or through-hole technology. In some embodiments, one or more of the processor 702, the memory 704, the chipset 706, and/or other components may be organized as a System on Chip (SoC).

The processor 702 may execute program code by accessing instructions loaded into memory 704 from a storage device, executing the instructions to operate on data also loaded into memory 704 from a storage device, and generate output data that is stored back into memory 704 or sent to another component. The processor 702 may include processing cores capable of implementing any of a variety of instruction set architectures (ISAs), such as the x86, POWERPC®, ARM®, SPARC®, or MIPS® ISAs, or any other suitable ISA. In multi-processor systems, each of the processors 702 may commonly, but not necessarily, implement the same ISA. In some embodiments, multiple processors may each have different configurations such as when multiple processors are present in a big-little hybrid configuration with some high-performance processing cores and some high-efficiency processing cores. The chipset 706 may facilitate the transfer of data between the processor 702, the memory 704, and other components. In some embodiments, chipset 706 may include two or more integrated circuits (ICs), such as a northbridge controller coupled to the processor 702, the memory 704, and a southbridge controller, with the southbridge controller coupled to the other components such as USB 710, SATA 720, and PCIe buses 708. The chipset 706 may couple to other components through one or more PCIe buses 708.

Some components may be coupled to one bus line of the PCIe buses 708, whereas some components may be coupled to more than one bus line of the PCIe buses 708. One example component is a universal serial bus (USB) controller 710, which interfaces the chipset 706 to a USB bus 712. A USB bus 712 may couple input/output components such as a keyboard 714 and a mouse 716, but also other components such as USB flash drives, or another information handling system. Another example component is a SATA bus controller 720, which couples the chipset 706 to a SATA bus 722. The SATA bus 722 may facilitate efficient transfer of data between the chipset 706 and components coupled to the chipset 706 and a storage device 724 (e.g., a hard disk drive (HDD) or solid-state disk drive (SDD)) and/or a compact disc read-only memory (CD-ROM) 726. The PCIe bus 708 may also couple the chipset 706 directly to a storage device 728 (e.g., a solid-state disk drive (SDD)). A further example of an example component is a graphics device 730 (e.g., a graphics processing unit (GPU)) for generating output to a display device 732, a network interface controller (NIC) 740, and/or a wireless interface 750 (e.g., a wireless local area network (WLAN) or wireless wide area network (WWAN) device) such as a Wi-Fi® network interface, a Bluetooth® network interface, a GSM® network interface, a 3G network interface, a 4G LTE® network interface, and/or a 5G NR network interface (including sub-6 GHz and/or mmWave interfaces).

The chipset 706 may also be coupled to a serial peripheral interface (SPI) and/or Inter-Integrated Circuit (I2C) bus 760, which couples the chipset 706 to system management components. For example, a non-volatile random-access memory (NVRAM) 770 for storing firmware 772 may be coupled to the bus 760. As another example, a controller, such as a baseboard management controller (BMC) 780, may be coupled to the chipset 706 through the bus 760. BMC 780 may be referred to as a service processor or embedded controller (EC). Capabilities and functions provided by BMC 780 may vary considerably based on the type of information handling system. For example, the term baseboard management system may be used to describe an embedded processor included at a server, while an embedded controller may be found in a consumer-level device. As disclosed herein, BMC 780 represents a processing device different from processor 702, which provides various management functions for information handling system 700. For example, an embedded controller may be responsible for power management, cooling management, and the like. An embedded controller included at a data storage system may be referred to as a storage enclosure processor or a chassis processor.

System 700 may include additional processors that are configured to provide localized or specific control functions, such as a battery management controller. Bus 760 can include one or more busses, including a Serial Peripheral Interface (SPI) bus, an Inter-Integrated Circuit (I2C) bus, a system management bus (SMBUS), a power management bus (PMBUS), or the like. BMC 780 may be configured to provide out-of-band access to devices at information handling system 700. Out-of-band access in the context of the bus 760 may refer to operations performed prior to execution of firmware 772 by processor 702 to initialize operation of system 700.

Firmware 772 may include instructions executable by processor 102 to initialize and test the hardware components of system 700. For example, the instructions may cause the processor 702 to execute a power-on self-test (POST). The instructions may further cause the processor 702 to load a boot loader or an operating system (OS) from a mass storage device. Firmware 772 additionally may provide an abstraction layer for the hardware, such as a consistent way for application programs and operating systems to interact with the keyboard, display, and other input/output devices. When power is first applied to information handling system 700, the system may begin a sequence of initialization procedures, such as a boot procedure or a secure boot procedure. During the initialization sequence, also referred to as a boot sequence, components of system 700 may be configured and enabled for operation and device drivers may be installed. Device drivers may provide an interface through which other components of the system 700 can communicate with a corresponding device. The firmware 772 may include a basic input-output system (BIOS) and/or include a unified extensible firmware interface (UEFI). Firmware 772 may also include one or more firmware modules of the information handling system. Additionally, configuration settings for the firmware 772 and firmware of the information handling system 700 may be stored in the NVRAM 770. NVRAM 770 may, for example, be a non-volatile firmware memory of the information handling system 700. NVRAM 770 may further store one or more container-specific firmware memory map namespaces for one or more containers concurrently executed by the information handling system.

Information handling system 700 may include additional components and additional busses, not shown for clarity. For example, system 700 may include multiple processor cores (either within processor 702 or separately coupled to the chipset 706 or through the PCIe buses 708), audio devices (such as may be coupled to the chipset 706 through one of the PCIe busses 708), or the like. While a particular arrangement of bus technologies and interconnections is illustrated for the purpose of example, one of skill will appreciate that the techniques disclosed herein are applicable to other system architectures. System 700 may include multiple processors and/or redundant bus controllers. In some embodiments, one or more components may be integrated together in an integrated circuit (IC), which is circuitry built on a common substrate. For example, portions of chipset 706 can be integrated within processor 702. Additional components of information handling system 700 may include one or more storage devices that may store machine-executable code, one or more communications ports for communicating with external devices, and various input and output (I/O) devices, such as a keyboard, a mouse, and a video display.

In some embodiments, processor 702 may include multiple processors, such as multiple processing cores for parallel processing by the information handling system 700. For example, the information handling system 700 may include a server comprising multiple processors for parallel processing. In some embodiments, the information handling system 700 may support virtual machine (VM) operation, with multiple virtualized instances of one or more operating systems executed in parallel by the information handling system 700. For example, resources, such as processors or processing cores of the information handling system may be assigned to multiple containerized instances of one or more operating systems of the information handling system 700 executed in parallel. A container may, for example, be a virtual machine executed by the information handling system 700 for execution of an instance of an operating system by the information handling system 700. Thus, for example, multiple users may remotely connect to the information handling system 700, such as in a cloud computing configuration, to utilize resources of the information handling system 700, such as memory, processors, and other hardware, firmware, and software capabilities of the information handling system 700. Parallel execution of multiple containers by the information handling system 700 may allow the information handling system 700 to execute tasks for multiple users in parallel secure virtual environments.

The schematic or flow chart diagrams of FIG. 5 and FIG. 6 is generally set forth as a logical flow chart diagram. As such, the depicted order and labeled steps are indicative of aspects of the disclosed method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagram, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

Machine learning models, as described herein, may include logistic regression techniques, linear discriminant analysis, linear regression analysis, artificial neural networks, machine learning classifier algorithms, or classification/regression trees in some embodiments. In various other embodiments, machine learning systems may employ Naive Bayes predictive modeling analysis of several varieties, learning vector quantization artificial neural network algorithms, or implementation of boosting algorithms such as Adaboost or stochastic gradient boosting systems for iteratively updating weighting to train a machine learning classifier to determine a relationship between an influencing attribute, such as received device data, and a system, such as an environment or particular user, and/or a degree to which such an influencing attribute affects the outcome of such a system or determination of environment.

If implemented in firmware and/or software, functions described above may be stored as one or more instructions or code on a computer-readable medium. Examples include non-transitory computer-readable media encoded with a data structure and computer-readable media encoded with a computer program. Computer-readable media includes physical computer storage media. A storage medium may be any available medium that can be accessed by a computer. By way of example, and not limitation, such computer-readable media can comprise random access memory (RAM), read-only memory (ROM), electrically-erasable programmable read-only memory (EEPROM), compact disc read-only memory (CD-ROM) or other optical disk storage, magnetic disk storage or other magnetic storage devices, or any other medium that can be used to store desired program code in the form of instructions or data structures and that can be accessed by a computer. Disk and disc includes compact discs (CD), laser discs, optical discs, digital versatile discs (DVD), floppy disks and Blu-ray discs. Generally, disks reproduce data magnetically, and discs reproduce data optically. Combinations of the above should also be included within the scope of computer-readable media.

In addition to storage on computer readable medium, instructions and/or data may be provided as signals on transmission media included in a communication apparatus. For example, a communication apparatus may include a transceiver having signals indicative of instructions and data. The instructions and data are configured to cause one or more processors to implement the functions outlined in the claims.

Although the present disclosure and certain representative advantages have been described in detail, it should be understood that various changes, substitutions and alterations can be made herein without departing from the spirit and scope of the disclosure as defined by the appended claims. Moreover, the scope of the present application is not intended to be limited to the particular embodiments of the process, machine, manufacture, composition of matter, means, methods and steps described in the specification. For example, although processors are described throughout the detailed description, aspects of the invention may be applied to the design of or implemented on different kinds of processors, such as graphics processing units (GPUs), central processing units (CPUs), and digital signal processors (DSPs). As another example, although processing of certain kinds of data may be described in example embodiments, other kinds or types of data may be processed through the methods and devices described above. As one of ordinary skill in the art will readily appreciate from the present disclosure, processes, machines, manufacture, compositions of matter, means, methods, or steps, presently existing or later to be developed that perform substantially the same function or achieve substantially the same result as the corresponding embodiments described herein may be utilized. Accordingly, the appended claims are intended to include within their scope such processes, machines, manufacture, compositions of matter, means, methods, or steps.

What is claimed is:

1. A method, comprising:
setting, by an information handling system through a wireless connection to a gaming controller, a plurality of light sources of the gaming controller to a respective plurality of light settings;
receiving, by the information handling system, image data capturing the plurality of light sources set to the plurality of light settings; and
calibrating, by the information handling system, the plurality of light sources by
comparing a first portion of the image data corresponding to a first light source of the plurality of light sources to a second portion of the image data corresponding to a second light source of the plurality of light sources, and
adjusting at least one of the plurality of light settings, based on comparing the first portion of the image data to the second portion of the image data.

2. The method of claim 1, wherein the first portion of the image data corresponding to the first light source of the plurality of light sources and the second portion of the image data corresponding to the second light source of the plurality of light sources are determined by an image recognition artificial intelligence.

3. The method of claim 1, wherein the calibrating, by the information handling system, the plurality of light sources further comprises, prior to adjusting at least one of the plurality of light settings, determining an estimated adjustment for at least one of the plurality of light settings using a calibrating artificial intelligence.

4. The method of claim 1, wherein the calibrating, by the information handling system, the plurality of light sources further comprises:
receiving, by the information handling system, updated image data capturing the plurality of light sources adjusted based on the plurality of light settings;
determining, from the updated image data, whether additional calibration is required; and
if additional calibration is required, repeating the steps for calibrating the plurality of light sources until no additional calibration is required.

5. The method of claim 1, wherein the adjusting at least one of the plurality of light settings is further based on a lighting configuration in an environment.

6. The method of claim 1, wherein the plurality of light settings include at least one of the following: a brightness setting, a color setting, a timing setting, or a context setting.

7. The method of claim 1, further comprising, after adjusting at least one of the plurality of light settings, storing information relating to the plurality of light settings in a database.

8. An information handling system, comprising:
a memory;
a processor coupled to the memory, wherein the processor is configured to perform steps comprising:
setting, by the information handling system through a wireless connection to a gaming controller, a plurality of light sources of the gaming controller to a respective plurality of light settings;
receiving, by the information handling system, image data capturing the plurality of light sources set to the plurality of light settings; and
calibrating, by the information handling system, the plurality of light sources by
comparing a first portion of the image data corresponding to a first light source of the plurality of light sources to a second portion of the image data corresponding to a second light source of the plurality of light sources, and
adjusting at least one of the plurality of light settings, based on comparing the first portion of the image data to the second portion of the image data.

9. The information handling system of claim 8, wherein the first portion of the image data corresponding to the first light source of the plurality of light sources and the second portion of the image data corresponding to the second light source of the plurality of light sources are determined by an image recognition artificial intelligence.

10. The information handling system of claim 8, wherein the calibrating, by the information handling system, the plurality of light sources further comprises, prior to adjusting at least one of the plurality of light settings, determining an estimated adjustment for at least one of the plurality of light settings using a light output matching artificial intelligence.

11. The information handling system of claim 8, wherein the calibrating, by the information handling system, the plurality of light sources further comprises:
receiving, by the information handling system, updated image data capturing the plurality of light sources set based on the plurality of light settings;
determining, from the updated image data, whether additional calibration is required; and
if additional calibration is required, repeating the steps for calibrating the plurality of light sources until no additional calibration is required.

12. The information handling system of claim 8, wherein the adjusting at least one of the plurality of light settings is further based on a lighting configuration in an environment.

13. The information handling system of claim 8, wherein the plurality of light settings include at least one of the following: a brightness setting, a color setting, a timing setting, or a context setting.

14. The information handling system of claim 8, further comprising, after the adjusting at least one of the plurality of light settings, storing information relating to the plurality of light settings in a database.

15. A computer program product, comprising:
a non-transitory computer readable medium comprising code for performing steps comprising:
setting, by an information handling system through a wireless connection to a gaming controller, a plurality of light sources of the gaming controller to a respective plurality of light settings;
receiving, by the information handling system, image data capturing the plurality of light sources set to the plurality of light settings; and
calibrating, by the information handling system, the plurality of light sources by
comparing a first portion of the image data corresponding to a first light source of the plurality of light sources to a second portion of the image data corresponding to a second light source of the plurality of light sources, and
adjusting at least one of the plurality of light settings, based on comparing the first portion of the image data to the second portion of the image data.

16. The computer program product of claim 15, wherein the first portion of the image data corresponding to the first light source of the plurality of light sources and the second portion of the image data corresponding to the second light source of the plurality of light sources are determined by an image recognition artificial intelligence.

17. The computer program product of claim 15, wherein the calibrating, by the information handling system, the plurality of light sources further comprises, prior to adjusting at least one of the plurality of light settings, determining an estimated adjustment for at least one of the plurality of light settings using a light output matching artificial intelligence.

18. The computer program product of claim 15, wherein the calibrating, by the information handling system, the plurality of light sources further comprises:
receiving, by the information handling system, updated image data capturing the plurality of light sources set based on the plurality of light settings;
determining, from the updated image data, whether additional calibration is required; and
if additional calibration is required, repeating the steps for calibrating the plurality of light sources until no additional calibration is required.

19. The computer program product of claim 15, wherein the adjusting at least one of the plurality of light settings is further based on a lighting configuration in an environment.

20. The computer program product of claim 15, wherein the plurality of light settings include at least one of the following: a brightness setting, a color setting, a timing setting, or a context setting.

* * * * *